G. W. SELL.
AUTOMOBILE WHEEL.
APPLICATION FILED MAR. 1, 1920.
1,368,199.
Patented Feb. 8, 1921.
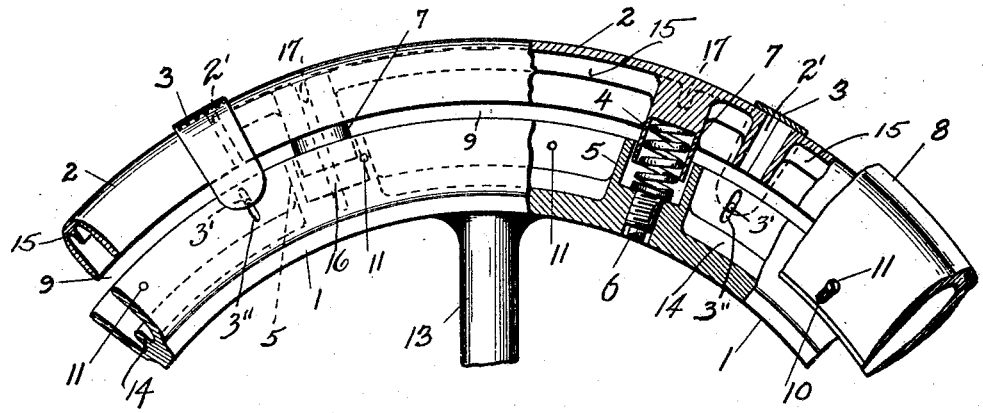
*Fig. II*
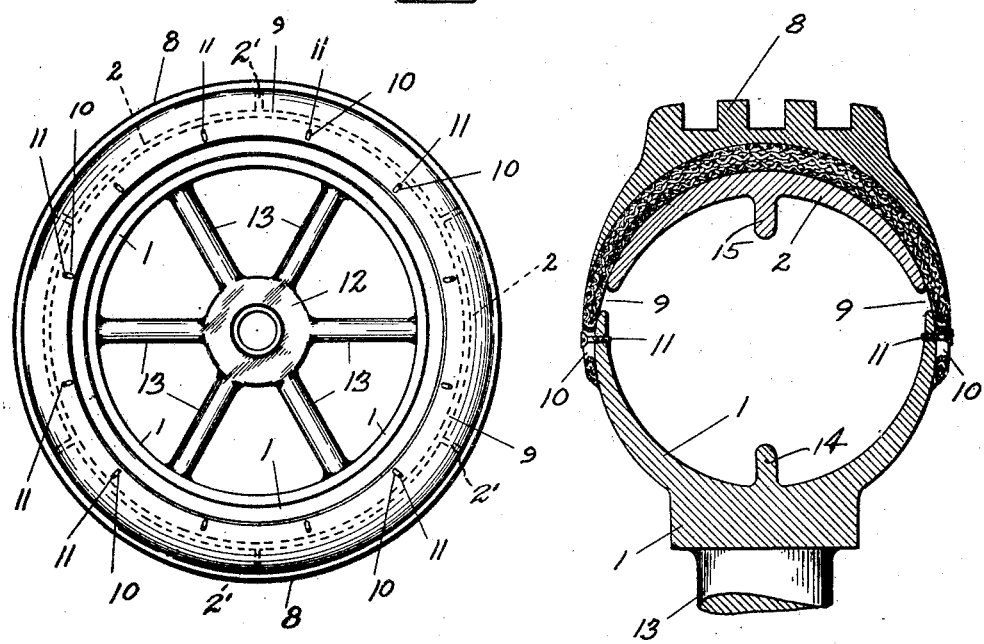
*Fig. I*
*Fig. III*
WITNESS
Geo. E. Savage
INVENTOR
G. W. Sell.
BY
A. B. Goldberg
ATTORNEYS

UNITED STATES PATENT OFFICE.

GEORGE W. SELL, OF PORTLAND, OREGON.

AUTOMOBILE-WHEEL.

1,368,199.  Specification of Letters Patent.  Patented Feb. 8, 1921.

Application filed March 1, 1920. Serial No. 362,312.

*To all whom it may concern:*

Be it known that I, GEORGE W. SELL, a citizen of the United States, residing in the city of Portland, county of Multnomah, and State of Oregon, have invented a new and useful Automobile-Wheel, of which the following is a specification.

My invention relates to improvements in automobile wheels in which resiliency is supplied by the wheel structure itself, and in which a tire casing with a minimum amount of rubber can be successfully employed.

The objects of my invention are to produce a wheel which allows the use of a cheaper tire casing, which eliminates the use of the customary air tube, and which, though not any more expensive than the usual type of automobile wheels, yet possesses the same easy riding qualities as the latter.

I attain these objects with the mechanism illustrated in the accompanying drawing, in which—

Figure I is a side elevation of the entire wheel.

Fig. II is a fragmental side elevation partly broken away and partly in section.

Fig. III is a cross section through the casing and felly.

Similar numerals refer to similar parts throughout the several views.

This invention is particularly intended as an improvement on the subject of my patent application for resilient automobile tire, filed on Jan. 5, 1920, under Serial Number 349657, there as here, the following elements are employed, viz:

The base portion 1 which is an integral, circular ring appearing in cross section as a crescent resting on a rectangular base; the tread portion which is also a circular ring substantially crescentiform in cross section, but composed of the segments 2 which join each other with tongue and groove joints 2' so that lateral flexure is prevented, and flexure in radial direction is permitted; the steel clips 3 which cover the joints and hook with the inturned ends 3' into slots 3'' in the base portion to hold the segments in resilient relation to the base portion; the helical compression springs 4 which are inserted between the tread and base portion, and of which two are allotted to each segment; said springs rest in the sockets 5 of the base portion and can be adjusted to the proper tension by means of the adjusting screws 6, but the manner of holding the springs in the tread portion is slightly modified in so far as the lugs, shown in my previous application, have been supplanted by sockets 7 which house the outer end of the springs 4, project radially from the tread portion, and slide within the sockets 5 of the base portion. This construction is deemed preferable in order to prevent the springs from rubbing against the inner walls of the sockets 5.

A rubber casing 8 covers the tread portion and promotes noiseless riding, but the side walls of the casing extend only just far enough over the sides to cover the space 9 (Fig. III) between the tread and base portions and to leave sufficient material for affixing the edges of the casing to the base portion. For this latter purpose the edges are, at suitable intervals, provided with elongated eyelets 10, and attached to the base portion with the screws 11; not only are said edges thereby held dust and water tight to the metal, but also a creeping of the tire is effectively prevented. Transverse strengthening ribs for the sockets 5 and 7 are shown in Fig. II by the numerals 16 and 17 respectively.

The casing along the edges where the eyelets are located should, of course, be sufficiently reinforced with fabric to prevent the latter from tearing out.

This arrangement, besides saving a large amount of rubber, has the further advantage that no extra rim is needed to hold the casing in place. I am consequently enabled to cast hub 12, spokes 13, and base portion 1 in one piece, whereby said base portion assumes the function of felly and support for the mechanism of resiliency at the same time.

The rib 14 in the base portion adds rigidity to said element; the rib 15 in the tread portion serves the same purpose.

Having thus described my invention, it will be seen that my objects have been accomplished and, though I have shown the preferred form of construction, I reserve to myself the right to make minor changes, providing I do not violate the spirit and principle of my invention.

I claim:

In an automobile wheel, the combination of a circular felly appearing in cross section substantially as a crescent resting on a rectangular base and forming with the hub and spokes an integral part of the wheel structure, a metallic tread in sections, substantially crescentiform in cross section, joined to each other by tongue-and-groove joints, and yieldingly attached to the felly by means of steel clips, with a rubber casing covering the entire tread and overlapping the edges of the felly, and screws to attach the edges of the casing to the edges of the felly.

Signed by me at Portland, Oregon, this 23rd day of February, 1920.

GEORGE W. SELL.